United States Patent [19]
Tani et al.

[11] 4,449,517
[45] May 22, 1984

[54] SOLAR HEAT PLANT

[75] Inventors: Tatsuo Tani; Sinji Sawata; Tadayoshi Tanaka; Koichi Sakuta, all of Ibaraki; Yasunobu Nakamoto, Yokohama; Hideshi Sekiya; Masanobu Morita, both of Tokyo; Norio Yamagata, Tomakomai, all of Japan

[73] Assignees: Agency of Industrial Science and Technology, Tokyo; Tokyo Shibaura Denki Kabushiki Kaisha, Kawasaki, both of Japan

[21] Appl. No.: 355,093

[22] Filed: Mar. 5, 1982

[30] Foreign Application Priority Data

Mar. 13, 1981 [JP] Japan .................................. 56-35392

[51] Int. Cl.³ .............................................. F24J 3/02
[52] U.S. Cl. ..................................... 126/435; 126/421; 60/641.8; 60/641.15
[58] Field of Search ............. 60/641.8, 641.13, 641.14, 60/641.15, 676; 126/421, 435

[56] References Cited
U.S. PATENT DOCUMENTS 3,152,442  10/1964  Rowekamp ........................ 60/641.8
4,010,732  3/1977  Sawata et al. ...................... 126/438
4,265,223  5/1981  Miserlis et al. ...................... 126/435

Primary Examiner—Allen M. Ostrager
Assistant Examiner—Stephen F. Husar
Attorney, Agent, or Firm—Oblon, Fisher, Spivak, McClelland & Maier

[57] ABSTRACT

A solar heat plant comprises a first system including a high temperature heat collector for changing solar energy to high temperature heat energy under usual sunshine and to low temperature heat energy under poor sunshine to supply the heat energy to a high temperature heat medium, a high temperature heat load which works under usual sunshine using the heat energy supplied to the high temperature heat medium, a second system including a low temperature heat collector for changing solar energy to low temperature heat energy under usual or poor sunshine to supply the heat energy to a low temperature heat medium, and a low temperature heat load which works under usual sunshine using the heat energy supplied to the low temperature heat medium and also works under poor sunshine using the heat energies supplied to the high and low temperature heat media.

10 Claims, 5 Drawing Figures

4,449,517

SOLAR HEAT PLANT

BACKGROUND OF THE INVENTION

The present invention relates to a solar heat plant and, more particularly, an improvement of solar heat plant intended to enhance the utilization of solar heat.

It is often said these days that oil energy will soon be used up, and the utilization of solar energy is thus drawing attention as a new energy source instead of oil energy. When solar energy is received on the ground, however, its input is not always certain. It changes for a day from morning to night and also depends upon the condition of climate. It is therefore necessary from the viewpoint of heat utilization that the true luminosity of solar light is enhanced to obtain a high temperature when heat collectors are subjected to a heat load which can not achieve a certain efficiency without high temperature. The installation cost of solar heat plant is thus made high. In addition, this high temperature can not be obtained when solar heat is poor, thus making the rate of plant operation low and the plant itself uneconomical. On the other hand, the installation cost will be made low when it is arranged that heat collectors are subjected to a heat load which can achieve the certain efficiency at low temperature. In this case, however, such energy that can be fully used at high temperature during the daytime of fine weather must be applied to the heat load which can achieve the certain efficiency at low temperature, and this is therefore uneconomical from the viewpoint of efficient use of natural energy.

It is often seen in general industry that energy is used in such form of electric power, vapor and heated water on a working site or in a building. Maximum energy can be therefore supplied according to the strength of solar light when a solar heat plant which can supply electric power, vapor and heated water is installed on such place. The use of auxiliary energy source can be suppressed to its minimum and the extent to which solar energy can be used can be enhanced more highly as compared with the single function solar heat plant. The appearance of such multi-function solar heat plant has been desired with eagerness.

SUMMARY OF THE INVENTION

The object of the present invention is therefore to provide a solar heat plant having two heat loop lines for low and high temperatures so as to use solar energy to the maximum extent and suitable for those energy demand systems in general industry.

According to an aspect of the present invention, there is provided a solar heat plant comprising a first system including a first heat collector for changing solar energy to high temperature heat energy under usual sunshine and to low temperature heat energy under poor sunshine to supply the heat energy to a first medium; a first heat load which works under usual sunshine using the heat energy supplied to the first medium; a second system including a second heat collector for changing solar energy to low temperature heat energy under usual or poor sunshine to supply the heat energy to a second medium; and a second heat load which works under usual sunshine using the heat energy supplied to the second medium and also works under poor sunshine using the heat energies supplied to the first and second media.

According to the present invention, heat medium loops different in property can be selected corresponding to each of temperature ranges, thus enabling the cost needed in relation to heat collectors to be made most economical and vapor, heated water and electric power needed on working sites and in buildings to be supplied simultaneously. In addition, the present invention allows the optimum operation to be achieved corresponding to sunshine and load conditions and the use of solar energy to be therefore enhanced remarkably. Namely, the present invention provides an extremely high reliable solar heat plant which can use solar heat more efficiently as compared with the conventional single function plant employed in the solar power plant and solar heat air-conditioning apparatus.

DETAILED DESCRIPTION OF THE PREFERRED EMBODIMENTS

One embodiment of solar heat plant according to the present invention will be described in detail referring to FIG. 1.

Figure 1:
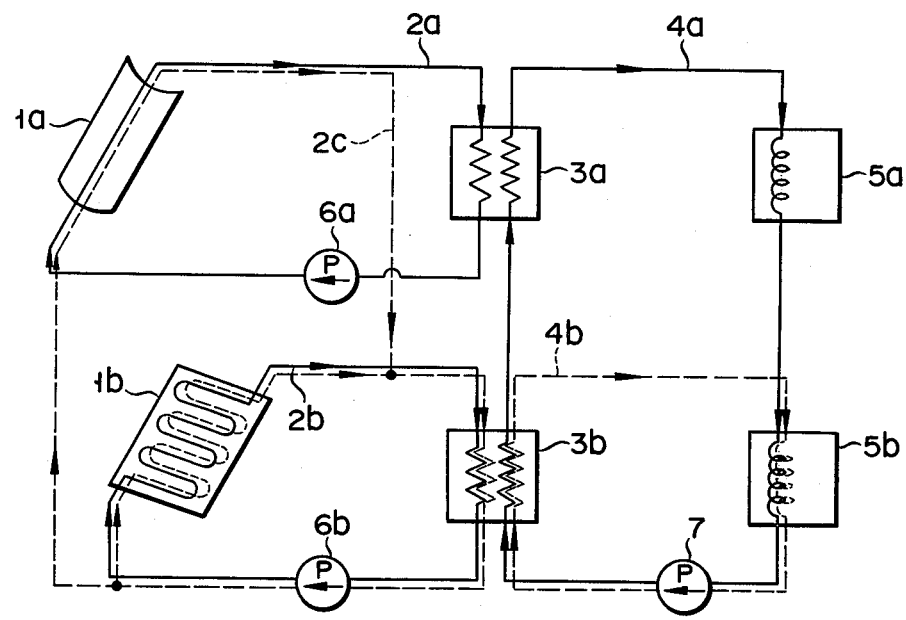
FIG. 1 is a block diagram schematically showing one embodiment of solar heat plant according to the present invention.

FIG. 1 schematically shows one embodiment of solar heat plant according to the present invention. Solid line represents a system employed under usual sunshine and broken line another system employed under poor sunshine. This solar heat plant comprises high and low temperature heat collectors $1a$ and $1b$ different in property and intended to catch solar energy, high and low temperature heat medium loops $2a$ and $2b$ for carrying heat collected by heat collectors $1a$ and $1b$ under usual sunshine, respectively, a high temperature heat medium loop $2c$ for carrying heat collected by the high temperature heat collector $1a$ under poor sunshine, a high temperature heat exchanger $3a$ for exchanging heat in the high temperature heat medium loop $2a$ employed under usual sunshine with an easily-used medium such as water, a low temperature heat exchanger $3b$ for exchanging heats in the high temperature heat medium loop $2c$ employed under poor sunshine and in the low temperature heat medium loop $2b$ with water, a high temperature water loop $4a$ for receiving heats from both high and low temperature heat exchangers $3a$ and $3b$ under usual sunshine, a low temperature water loop $4b$ for receiving heat from low temperature heat exchanger $3b$ under poor sunshine, high and low temperature heat loads $5a$ and $5b$ for working using heat energy transported through high temperature water loop $4a$ under usual sunshine, the low temperature heat load $5b$ being working only using heat energy transported through low temperature water loop $4b$ under poor sunshine, a high temperature heat medium pump $6a$ for circulating heat medium in the high temperature heat medium loop $2a$ employed under usual sunshine, a low temperature heat medium pump $6b$ for circulating heat media in the high temperature heat medium loop 2c employed under poor sunshine and in the low temperature heat medium loop 2b, and a common water pump 7 for circulating water in high and low temperature water loops 4a and 4b. The low temperature heat medium loop 2b is also employed under poor sunshine.

Solar beam energy is caught by heat collectors 1a and 1b under usual sunshine and changed therein to heat energy to be transmitted to heat media as shown by solid line. High and low temperature heat media thus raised in temperature flow through heat medium loops 2a and 2b, respectively, and heat exchanges are carried out through high and low temperature heat exchangers 3a and 3b with water in the high temperature water loop 4a. Heat media thus lowered in temperature due to heat exchange are pressurized by heat medium pumps 6a and 6b, respectively, to return to heat collectors 1a and 1b. These heat media thereafter continue to circulate through heat medium loops 2a and 2b shown by solid line. A close relation exists in this case between the property and cost of heat collectors 1a and 1b. Namely, if the temperature of heat media may be lower than hundred and several tens degrees in Centigrade, it can be obtained by the low temperature heat collector 1b of non-beam-condensing and non-tracking type and the low temperature heat collector 1b may be of fixed plate type, for example. However, it is necessary to obtain a higher temperature that solar beam is condensed using mirrors or lenses. The heat collector must move automatically to always catch the sun to obtain a temperature higher than 200° C. The high temperature heat collector 1a must be therefore of beam condensing and tracking type. Needless to say, heat collectors of beam condensing and tracking type are extremely higher in cost than those of non-beam-condensing and non-tracking type. It is therefore important that heat collectors most suitable for obtaining a desired temperature are employed.

Water in the high temperature water loop 4a heated by the low temperature heat exchanger 3b are raised in temperature under usual sunshine is further raised in temperature by the high temperature heat exchanger 3a to apply its heat to the high temperature heat load 5a. Water coming out of high temperature heat load 5a is still so hot as to give its heat even to the low temperature heat load 5b. Water coming out of low temperature heat load 5b is returned by the water pump 7 to the low temperature heat exchanger 3b. As described above, water circulates through the high temperature water loop 4a to use solar energy to the greatest extent under usual sunshine.

Under poor sunshine such as in the morning, evening and on a cloudy day, however, the high temperature heat exchanger 3a can not provide a temperature high enough to allow the high temperature heat load 5a to achieve satisfactory efficiency. Under such circumstance, therefore, the high temperature heat medium loop 2a is switched over by means of a valve (not shown) to the loop 2c as shown by broken line in FIG. 1. Namely, heat obtained through the high temperature heat collector 1a under poor sunshine is fed through the high temperature heat medium loop 2c to the low temperature heat exchanger 3b and added to heat obtained through the low temperature heat collector 1b to be heat-exchanged by the low temperature heat exchanger 3b with water in the low temperature water loop 4b. The low temperature water loop 4b is bypassed from the high temperature heat exchanger 3a and heat load 5a, and heat is introduced directly to the low temperature heat load 5b. All of heat obtained through high and low temperature heat collectors 1a and 1b is thus applied to the low temperature heat load 5b. As a result, heat as high as the system could can be supplied to the low temperature heat load 5b by this switchover of loops.

Figure 2:
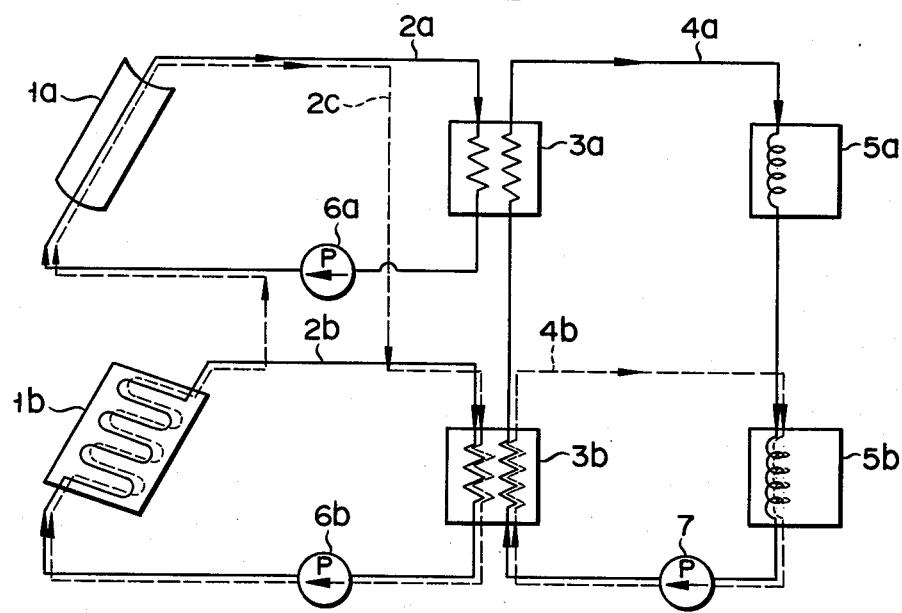
FIG. 2 is a block diagram schematically showing a modification of one embodiment of FIG. 1.

FIG. 2 shows a switchover type modification of embodiment shown in FIG. 1. In the case of embodiment shown in FIG. 1, heat collectors 1a and 1b are operated parallel to the low temperature heat exchanger 3b under poor sunshine while in series in the case of the modification shown in FIG. 2. It is also possible to construct the plant in such a way that series and parallel operations are selectively switched over according to circumstances. When this embodiment is employed, usual or poor sunshine can be covered to achieve the efficient use of heat.

Systems shown in FIGS. 1 and 2 are only illustrated as examples of construction and high and low temperature loops in heat medium and water sections may be variously modified corresponding to the type of heat needed.

Figure 3:
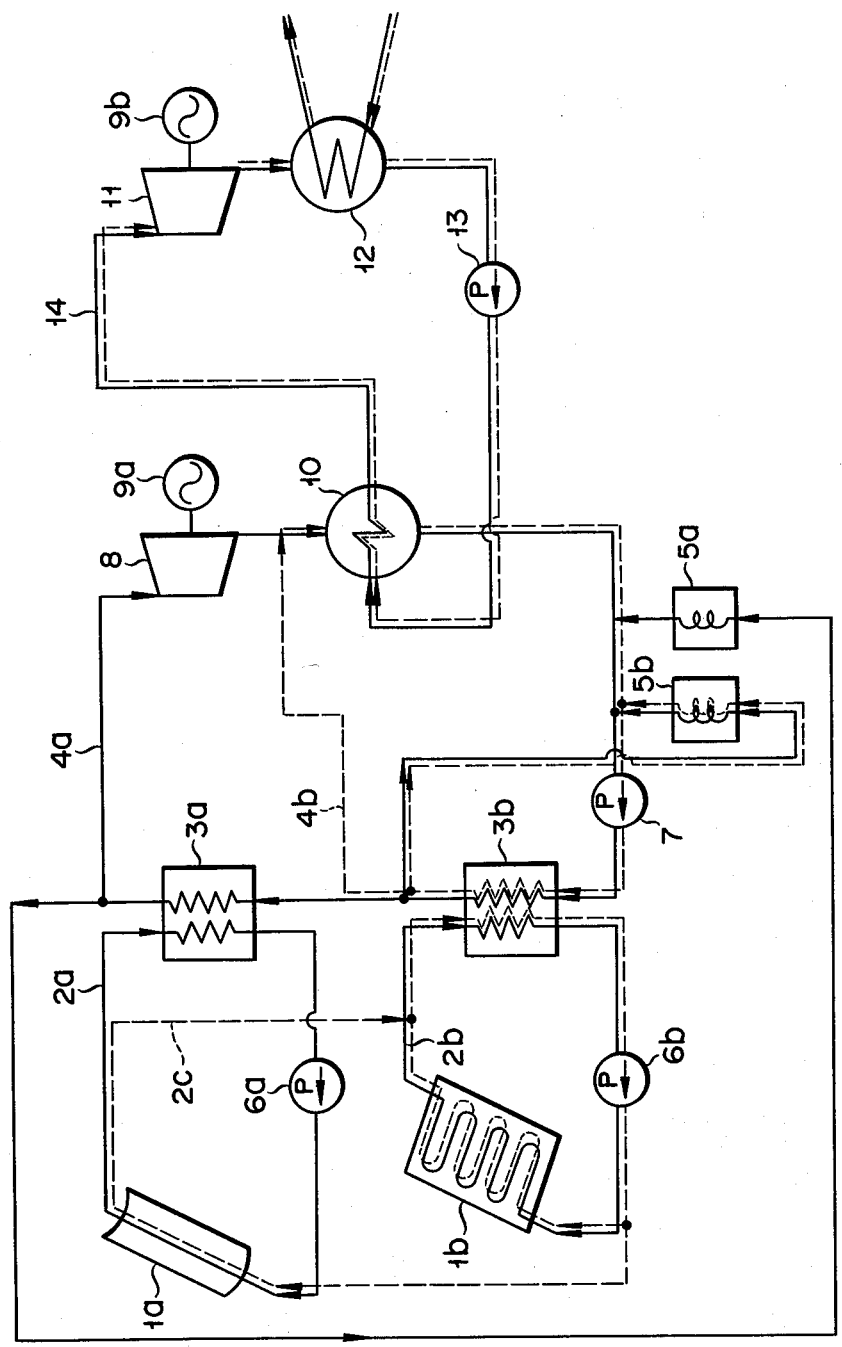
FIG. 3 is a block diagram more concretely showing the system of one embodiment of solar heat plant according to the present invention.

FIG. 3 shows a more concrete construction of solar heat plant according to the present invention. The high temperature heat exchanger 3a comprises a vapor generator. High temperature vapor generated through the high temperature heat exchanger 3a under usual sunshine is supplied to the high temperature heat load 5a as steam employed in industrial processes and also fed to a steam turbine 8. Power is generated by a generator 9a driven by the steam turbine 8. The heat of the vapor exhausted from the steam turbine 8 is applied through a low boiling point medium evaporator 10 to a low boiling point medium such as freon. This low boiling point medium drives a low boiling point medium turbine 11, which in turn drives a generator 9b to generate power. A part of hot water heated by the low temperature heat exchanger 3b is fed not to the high temperature heat exchanger 3a but directly to the low temperature heat load 5b such as a heating apparatus, for example. Water lowered in temperature after transmitting its heat to the high temperature heat load 5a, low temperature heat load 5b and low boiling point medium evaporator 10, respectively, is returned by the water pump 7 to the low temperature heat exchanger 3b and continues thereafter to circulate as described above. The low boiling point medium exhausted from the low boiling point medium turbine 11 is condensed by a low boiling point medium condenser 12 and then returned by a low boiling point medium pump 13 to the low boiling point medium evaporator 10 to circulate through a low boiling point medium loop 14.

In the case where sunshine becomes poor and the temperature obtained through the high temperature heat collector 1a lowers to such a value as is undesirable to drive the steam turbine 8 or to be applied to the high temperature heat load 5a, the high temperature heat medium loop is switched over by means of a valve (not shown) from the loop 2a shown by solid line to the loop 2c shown by broken line. Since water is not supplied to the high temperature heat exchanger 3a when switched over, the steam turbine 8 is stopped. On the other hand, a part of hot water coming out of low temperature heat exchanger 3b is supplied to the low boiling point medium evaporator 10 passing through the low temperature water loop 4b so that the operation of low boiling point medium turbine 11 continues to drive the generator 9b to generate power. The supply of steam to the high temperature heat load 5a is stopped but the supply of hot water to the low temperature heat load 5b is continued.

If a material having a boiling point higher than the temperature obtained through the high temperature heat collector 1a and also having a freezing point lower than the lowest atmospheric temperature in winter season is employed as heat medium, heat medium loops 2a, 2b and 2c are always filled with liquid phase, thus enabling the arrangement and operation control of various means employed to be made simple.

FIG. 3 shows the fundamental arrangement of solar heat plant according to the present invention and other means such as auxiliary heat source, heat storage means and valve are practically added to this arrangement. However, they are not main components of the present invention and illustration and description on them are therefore omitted.

Figure 4:
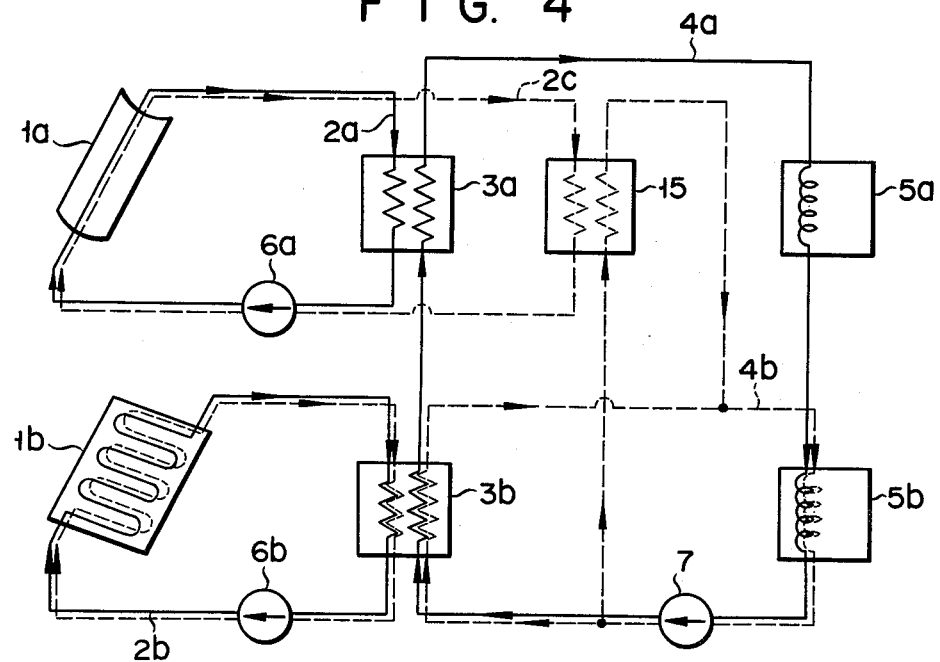
FIG. 4 is a block diagram showing another embodiment of solar heat plant according to the present invention.

FIG. 4 is a block diagram showing another embodiment of solar heat plant according to the present invention. A heat exchanger 15 intended for poor sunshine is added to the high temperature heat medium loop 2c also intended for poor sunshine. Heat obtained through the high temperature heat collector 1a under poor sunshine is transmitted through the heat exchanger 15 for poor sunshine to water in the low temperature water loop 4b. Water in the low temperature water loop 4b is divided to two parts by a valve (not shown) after coming out of water pump 7, and the one receives heat, which comes from the low temperature heat collector 1b, through the low temperature heat exchanger 3b while the other receives heat, which comes from the high temperature heat collector 1a, through the heat exchanger 15 for poor sunshine. These heated waters join again to apply their heats to the low temperature heat load 5b.

Figure 5:
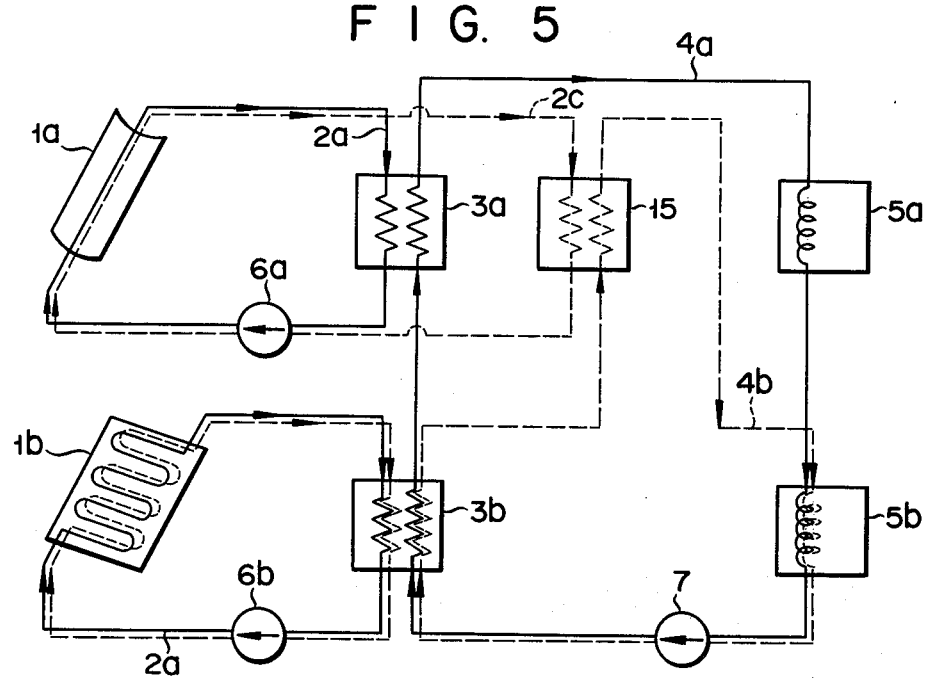
FIG. 5 is a block diagram showing a modification of another embodiment of FIG. 4.

FIG. 5 shows a switchover type modification of another embodiment shown in FIG. 4. The low temperature heat exchanger 3b and heat exchanger 15 for poor sunshine are operated parallel to the low temperature heat load 5b in FIG. 4 while they are operated in series with it in FIG. 5. The switchover between high temperature heat medium loops 2a and 2c is controlled so as to cause the plant to be operated corresponding to the condition of sunshine in one embodiment shown in FIGS. 1 and 2, while the switchover between water loops 4a and 4b is controlled in another embodiment shown in FIGS. 4 and 5. Plant systems in any cases can similarly enhance the utilization of solar heat. The heat exchanger 15 for poor sunshine which is not employed in one embodiment shown in FIGS. 1 and 2 is added as a new component to another embodiment shown in FIGS. 4 and 5. However, these systems shown in FIGS. 4 and 5 may be sometimes advantageous when considering the operational property and the like of each of means employed to the utmost extent. In addition, high and low temperature heat medium loops 2c and 2b are not joined with each other in embodiments shown in FIGS. 4 and 5, so that different heat media most suitable for respective temperature conditions can be employed.

Systems and operation types described above are only illustrative and it should be understood that other various arrangements and types can be embodied to achieve same effect.

The heat medium line is not necessarily formed to have two loops but may have three or more loops if necessary. Three or more kinds of heat collectors may be employed and the number of heat collectors may not correspond to the number of heat medium loops. Three kinds of high, middle and low temperature heat collectors may be employed, for example, in such a way that the low temperature heat collector is incorporated into the low temperature heat medium loop and that middle and high temperature heat collectors are combined in series to form the high temperature heat medium loop, in which heat medium raised in temperature through the middle temperature heat collector is further raised in temperature through the high temperature heat collector.

The combination of heat loads 5a and 5b, steam turbine 8 and low boiling point medium turbine 11 shown in FIG. 3 can be variously modified as modifications of one embodiment shown in FIG. 1 corresponding to needs of heat and power.

The operation type shown in FIG. 3 is not limited to two cases of usual and poor sunshine but may be modified otherwise depending on conditions of sunshine and load. For example, only one or two of steam, hot water and power may be supplied as outputs of plant. In addition, the amount of each of output is not fixed in relative ratio but may be freely determined.

It should be understood that the present invention can be variously modified without departing the scope and spirit thereof.

What we claim is:

1. A solar heat plant comprising:
   a first system including a first heat collector for changing solar energy to high temperature heat energy under usual sunshine and to low temperature heat energy under poor sunshine to supply said heat energy to a first medium;
   a first heat load which works under usual sunshine using said heat energy supplied to the first medium;
   a second system including a second heat collector for changing solar energy to low temperature heat energy under usual or poor sunshine to supply said heat energy to a second medium; and
   a second heat load which works under usual sunshine using said heat energy supplied to the second medium and also works under poor sunshine using said heat energies supplied to the first and second media.

2. The solar heat plant according to claim 1 wherein:
   said first system includes a first loop through which the first medium is circulated via the first heat collector under usual sunshine; a second loop through which the first medium is circulated via the first heat collector under poor sunshine; a third loop through which a third medium is circulated via the first heat load under usual sunshine; and a first heat exchanger through which said first and third loops are passed to apply heat energy of said first medium to the third medium, and
   said second system includes a fourth loop through which the second medium is circulated via the second heat collector under usual or poor sunshine; a fifth loop through which are third medium is circulated via the second heat load under poor sunshine; and a second heat exchanger through which said fourth and fifth loops are passed to apply heat energy of said second medium to said third medium.

3. The solar heat plant according to claim 2 wherein said second loop passes through the second heat exchanger.

4. The solar heat plant according to claim 3 wherein said third loop passes through the second heat exchanger via the second heat load.

5. The solar heat plant according to claim 4 wherein said second and fourth loops are arranged parallel to the second heat exchanger.

6. The solar heat plant according to claim 4 wherein said second and fourth loops are arranged in series with the second heat exchanger.

7. The solar heat plant according to claim 2 wherein said first system includes a third heat exchanger through which said second and fifth loops are passed to apply heat energy of said first medium to the third medium.

8. The solar heat plant according to claim 7 wherein said third loop passes through the second heat exchanger via the second heat load.

9. The solar heat plant according to claim 8 wherein said second and fifth loops are arranged in series with the second heat exchanger.

10. The solar heat plant according to claim 8 wherein said second and fifth loops are arranged parallel to the second heat load.

* * * * *